United States Patent [19]

Chang

[11] Patent Number: 4,901,823
[45] Date of Patent: Feb. 20, 1990

[54] BRAKE MECHANISM

[76] Inventor: Morgan Chang, No. 291, Sec. 1, Chang Nan Rd., Chang Hwa City, Taiwan

[21] Appl. No.: 269,897

[22] Filed: Nov. 10, 1988

[51] Int. Cl.⁴ .............................................. F16D 65/06
[52] U.S. Cl. .................................... 188/73.1; 188/245; 188/250 G
[58] Field of Search ................... 188/24.22, 73.1, 245, 188/246, 250 B, 250 D, 250 G

[56]  References Cited
U.S. PATENT DOCUMENTS 2,541,978  2/1951  Amundsen ..................... 188/245 X
4,611,692  9/1986  Everett ................................ 188/73.1

FOREIGN PATENT DOCUMENTS 0973045  2/1951  France ............................... 188/73.1

Primary Examiner—Duane A. Reger
Attorney, Agent, or Firm—Lahive & Cockfield

[57] ABSTRACT

A brake mechanism including a brake block, a positioning member, a bolt and a semi-circular portion. The positioning member is mounted to the brake block and the bolt is disposed between them. Then a rod of the bolt passes through a bore which is formed on the positioning member. The semi-circular portion has a radial serration formed on one side thereon to increase the friction force between the serrated side and a brake arm which the assembly device is fastened thereon. By means of those spherical surfaces in the same curvature between the means, the brake block is always in the desired condition to achieve the purpose of stopping the rolling wheel efficiently.

3 Claims, 9 Drawing Sheets

BRAKE MECHANISM

BACKGROUND OF THE INVENTION

The present invention relates to a positioning device for a brake mechanism and in particular to such a device which can securely fasten a brake block to a brake arm by means of spherical surfaces between the means so as to be adjustable in any desired direction.

In the past, brake blocks made of rigid rubber served to stop bicycle wheels and were integral with a bolt in order to be fixed on a brake arm by a nut, so that the brake block was in a constant direction of contact with the rim of a bicycle wheel. However, the brake block will be deformed after a long period so as to vary the relative angle between the brake block and the rim. Such a condition reduces braking efficiency. So, those skilled in this art improved the brake mechanism by inserting a packing ring and a washer between the brake block and brake arm and between the brake arm and nut respectively. In this conventional braking mechanism, shown in FIG. 1, a packing ring 91 and a washer 92 are respectively provided on each side of the brake arm 6. The area of central bores of the packing ring 91 and washer 92 is larger than the cross-section of the bolt 81. Therefore, the brake block can rotate through a slight angle by means of the gap between the packing ring 91, washer 92 and bolt 81, and the spherical contacting-surface between the packing-ring 91 and nut 7. However, some disadvantages still exist, for example, it is necessary to dismount the nut 7 before setting the desired position of the brake block 8 and then to adjust the packing ring 91 and washer 92, and lastly mount the nut 7. But the packing ring 91 and washer 92 are still shiftable during the mounting operation, in other words, the operative procedure is complicated and inaccurate.

SUMMARY OF THE INVENTION

In order to obviate and/or mitigate the above-mentioned disadvantages in the manner set forth in the detailed description of the preferred embodiment, the objective of the present invention is to provide a brake mechanism comprising a positioning member, bolt and contact means, wherein the bolt can be offset from the brake block to receive a semi-circular portion then mount a nut and be fixed on the brake arm. Thus, the brake block can be adjustable to a desired position by means of the spherical surfaces between the semi-circular portion, positioning member and bolt.

Another objective of the present invention is to provide a brake mechanism comprising a positioning member, and a bolt, wherein the bolt offsets from the brake block to receive a semi-circular portion then mounts to the brake arm by a nut. Thus, the brake block is adjustable to any desired position by means of the spherical surfaces between the semi-circular portion, positioning member and the bolt.

Further objectives and advantages of the present invention will become apparent as the following description proceeds, and the features of novelty which characterize the invention will be pointed out with particularity in the claims annexed to and forming a part of this invention.

DETAILED DESCRIPTION OF THE PREFERRED EMBODIMENT

Figure 1:
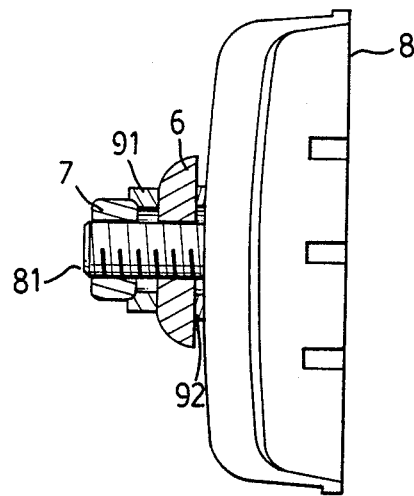
FIG. 1 is a partial cross-sectional view of a prior art brake mechanism.
Figure 2:
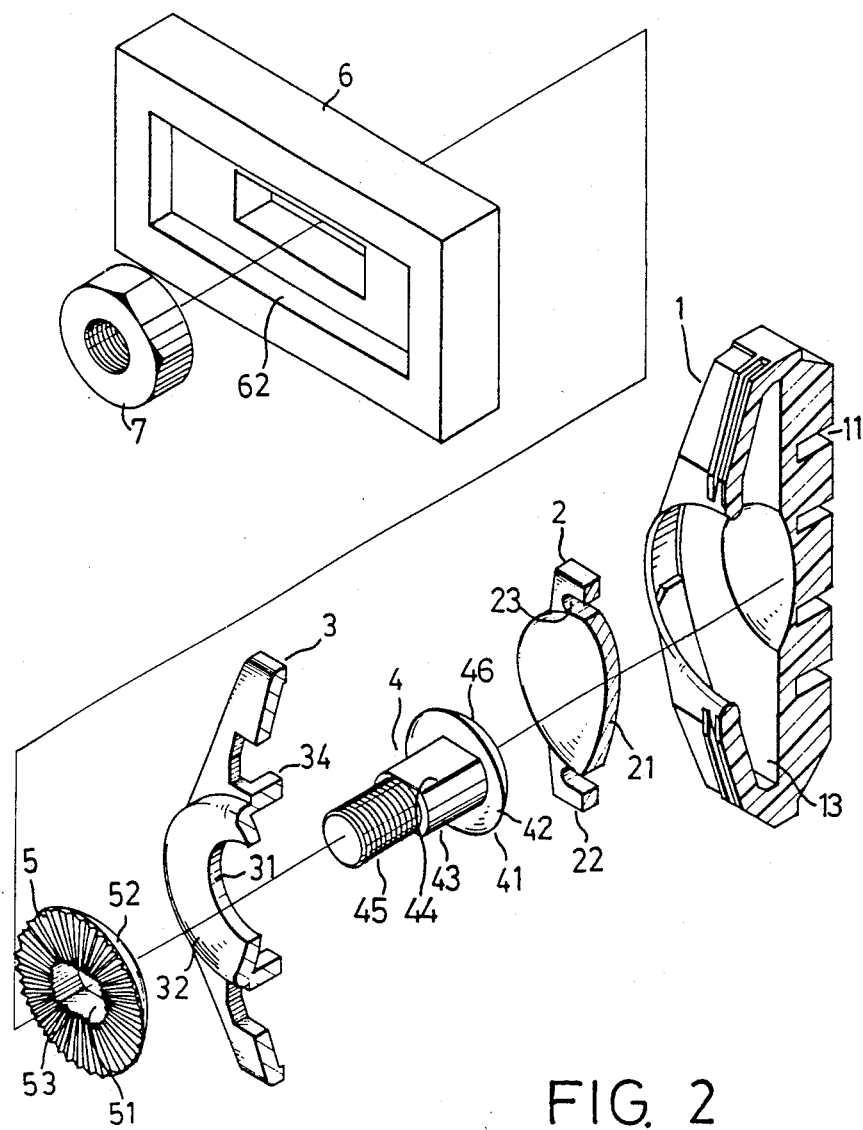
FIG. 2 is an exploded view of a first embodiment of a brake mechanism in accordance with the present invention.

One embodiment of a brake mechanism in accordance with the invention is shown in FIG. 2, the brake mechanism comprises a substantially rectangular brake block 1, a contact means 2, a positioning member 3, a bolt 4 and a semi-circular portion 5. A plurality of grooves 11 are arranged on the outer side of the brake block 1. A recess 13 of the brake block 1 slidably permits consecutively the accommodation of the contact means 2, a head 41 of the bolt 4 and the positioning member 3, which is similar in shape to the brake block 1 but smaller in size, and which is mounted on one side of the brake block 1. The semi-circular portion 5 is mounted to the bolt 4, but outside of the recess 13. The positioning member 3 has a bore 31 for receiving the bolt 4 in the middle, and two protruding means 34 are diametrically opposed to each other in the vicinity of the bore 31. The assembly device is then fastened to a brake arm 6 by a nut 7.

The contact means 2 has a spherical piece 21 and two engagement means 22 at two longitudinal ends of the piece 21 so as to form two engagement recesses 23 serving to mount with the positioning member 3 at a location on which two protruding means 34 are located. The bolt 4, which is interposed between the contact means 2 and the positioning member, comprises a head 41, the rod 43 which is integral with the head 41 and which has two flat faces 44 thereon, and a threaded end 45. Usually, the head 41 has an outer surface 46, which contacts the spherical piece 21, and a concave face 42.

Abutting to the positioning member 3, the semi-circular portion 5, one side of which having radial serrations 53 for the purpose of increasing the frictional force between the serrated face and the brake arm 6, and the other side being a convex surface 52 mounts to the rod 43. Furthermore, the shape of a central hole 51 of the semi-circular portion 5 corresponds in shape with the rod 43, thereby preventing rotational motion between the semi-circular portion 5 and the bolt 4.

Figure 3:
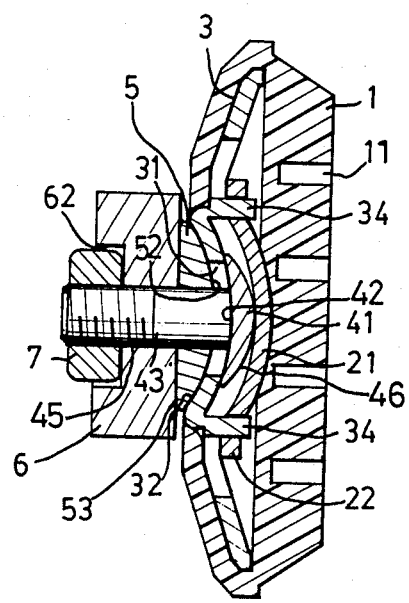
FIG. 3 is a longitudinal cross-sectional view of the first embodiment in accordance with the present invention.

Referring to FIG. 3, it can be seen that the curvature of the concave face 42 can match the curvature of a margin 32 of the bore 31, and the curvature of the margin 32 also matches a curvature of a convex surface 52 of the semi-circular portion 5. The curvature of the outer surface 46 of the head 41 is greater.

Accordingly, after assembling the brake block 1, the contact means 2, the bolt 4 and the positioning member 3 together, the semi-circular portion 5 is then mounted to the rod 43 of the bolt 4, and there is no relative motion between the semi-circular portion 5 and the bolt 4 due to the two flat faces 44 of the rod 43.

Figure 4:
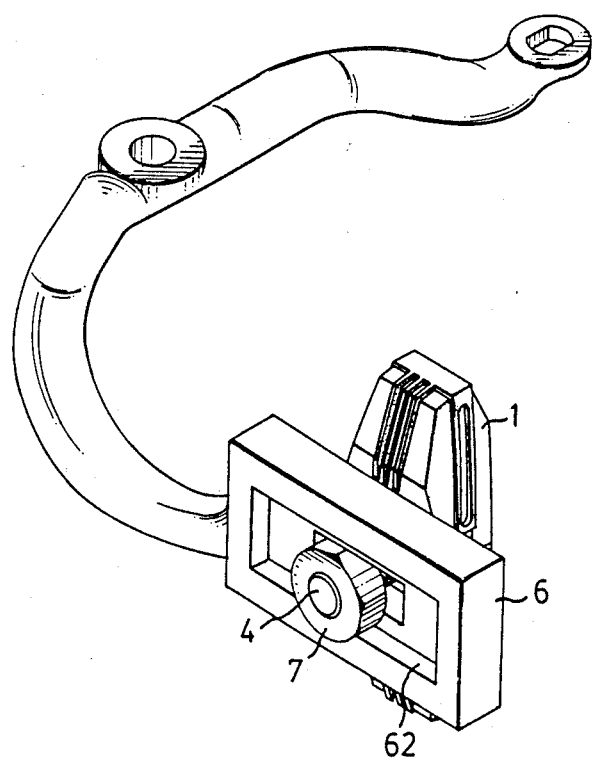
FIG. 4 is a perspective view of the first embodiment in accordance with the present invention, illustrating the brake block positioned on the brake arm.

Furthermore, the brake mechanism can be fastened to the brake arm 6 by mounting the nut 7 to the threaded end 45. However, the nut 7 is positioned in a depression 62 of the brake arm 6, as shown in FIG. 4.

Figure 6:
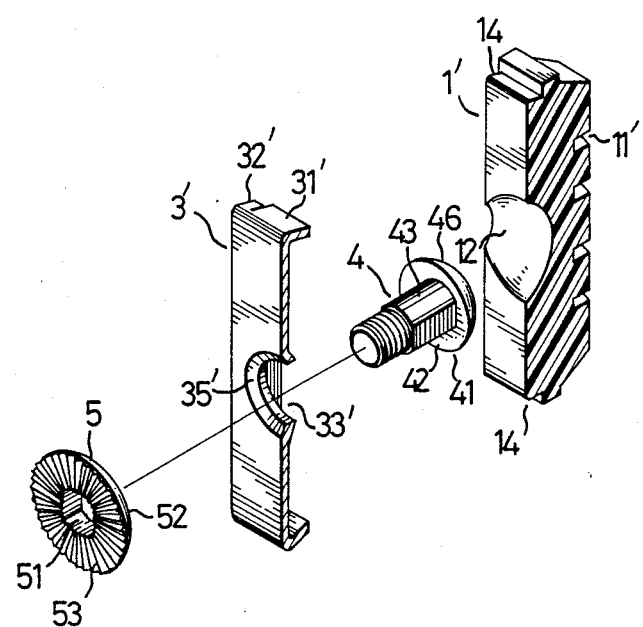
FIG. 6 is an exploded view of a seccond embodiment in accordance with the present invention.

Referring now to FIG. 6 there is shown a second embodiment of brake mechanism according to the present invention, the brake mechanism comprises a brake block 1' and a positioning member 3', a bolt 4 and a semi-circular portion 5. The bolt 4 and the semi-circular portion 5 are substantially identical to the like-numbered part of the first embodiment. On the brake block 1', a plurality of grooves 11' and a socket 12 serving to receive the head 41 of the bolt 4 are arranged and two transverse notches 14 are provided on each longitudinal end thereof respectively. The bolt 4, which head 41 contacts with the socket 12, passes through a bore 33' of the positioning member 3' to mount with the semi-circular portion 5. Additionally, the positioning member 3' comprises two clamps 31' on each end and a side plate 32', the clamps 31' and side plate 32' being for the engagement with the brake block 1'. Thus, between the brake block 1' and the positioning member 3', the bolt 4 is interposed.

Figure 7:
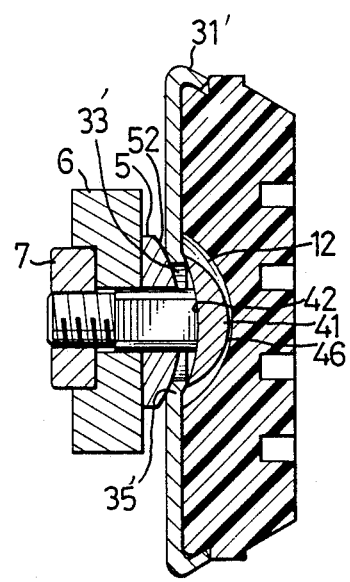
FIG. 7 is a longitudinal cross-sectional view of the second embodiment in accordance with the present invention.

With reference to FIG. 7, the curvature of a margin 35' of the bore 33' matches the curvature of the concave face 42 of the head 41 and the curvature of the margin 35' also matches the curvature of the convex face 52 of the semi-circular portion 5 but the outer face 46 of the head 41 has the greater curvature.

Figure 8:
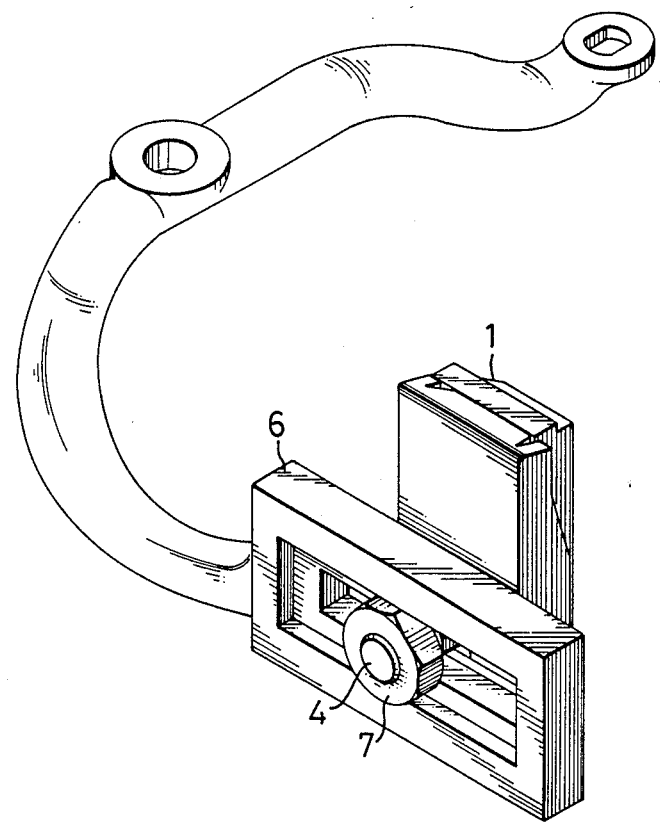
FIG. 8 is a perspective view of the second embodiment in accordance with the present invention illustrating the brake block positioned on the brake arm.

The brake block 1' is made of rigid rubber so that the positioning member 3' can securely clamp the brake block 1' by means of the clamps 31'. As can be seen in FIG. 8, the brake block 1' can be fastened to the brake arm 6 in the manner stated in the preceding embodiment.

Figure 5:
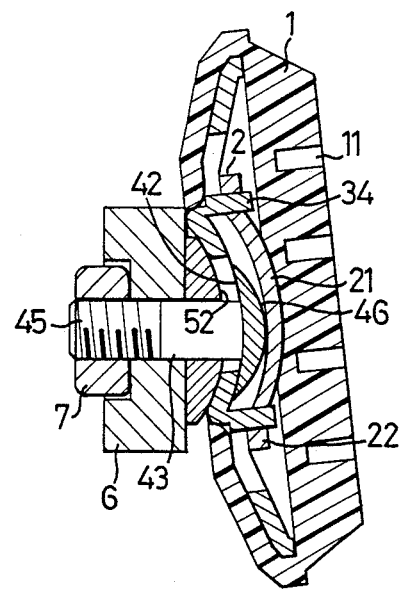
FIG. 5 is a cross-sectional view of the first embodiment in accordance with the present invention illustrating the motion of the brake block.
Figure 9:
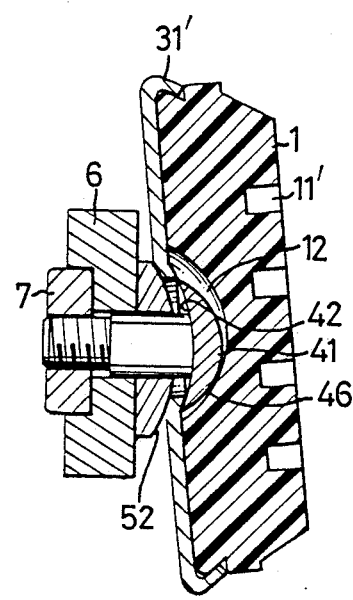
FIG. 9 is a cross-sectional view of the second embodiment in accordance with the present invention illustrating the motion of the brake block.

Referring to FIGS. 5 and 9, it can be seen that it is only necessary to unscrew the nut 7 before altering the orientation of the brake blocks 1 and 1'. Owing to these spherical surfaces of the same curvature, the brake mechanism can always be in a secured condition.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

I claim:

1. A brake mechanism attached to a bicycle brake arm, comprising:
    a brake block made of rigid plastic and a plurality of grooves formed thereon to increase frictional force to stop a bicycle wheel;
    a positioning member engageable with said brake block having a bore centrally formed thereon, so that a bolt is interposable therebetween;
    said bolt having a head, a rod connected to said head and a threaded end following said rod; said head having an outer surface and a concave face; and said rod having two flat faces provided thereon;
    a semi-circular portion having a convex face, a central hole shaped corresponding to said rod so as to prevent relative rotation therebetween, and one side of said semi-circular portion having radial serrations thereon;
    said brake block and said positioning member being engageable together so that said bolt is interposed therebetween and said rod is passable through said bore of said positioning member to receive said semi-circular portion by mounting on said rod;
    a curvature of said concave face of said head matching a curvature of a margin of said bore; said curvature of said margin matching a curvature of said convex face of said semi-circular portion; a curvature of said outer surface of said head being greater.

2. A brake mechanism as claimed in claim 1, wherein said brake block is substantially rectangular and two respective transverse notches are arranged on two longitudinal ends thereof, a socket being provided thereon to receive said head of said bolt;
    said positioning member being provided with a respective clamp on two ends thereof to securely clamp said brake block and also being provided with a side plate.

3. A brake mechanism as claimed in claim 1, wherein said positioning member is similar to said brake block in shape but smaller in size and has two protruding means proximate to said bore for engaging with a contact means which has a spherical piece and two engagement recesses;
    said protruding means being engageable with said engagement recesses so that said contact means and said positioning member are engageable with each other, and said bolt being interposed therebetween;
    said brake block having a recess for accommodation of a combination of said positioning means, said contact means and said bolt therein;
    said rod being passable through said bore of said positioning member for engagement with said semi-circular portion.

* * * * *